June 3, 1924. 1,496,690

H. E. VANDERVEER

SPOTLIGHT

Filed Jan. 16, 1922

Inventor

H. E. Vanderveer

By Lloyd W. Patch his Attorney

Patented Jun 3, 1924.

1,496,690

UNITED STATES PATENT OFFICE.

HERBERT E. VANDERVEER, OF PUEBLO, COLORADO.

SPOTLIGHT.

Application filed January 16, 1922. Serial No. 529,627.

*To all whom it may concern:*

Be it known that I, HERBERT E. VANDERVEER, resident of Pueblo, in the county of Pueblo and State of Colorado, citizen of the United States, have invented certain new and useful Improvements in Spotlights, of which the following is a specification.

This invention relates to spotlights, and particularly to a spotlight adapted to be used upon motor vehicles and to be applied to project through an opening in the windshield of the vehicle.

An object is to provide a spotlight structure which is mounted by a bracket adapted to be set into an opening formed through the windshield and which bracket structure includes bearing portions adapted to provide for shifting of the light casing to direct the rays from the spotlight at any angle upwardly and downwardly and to the right and left hand.

A further object resides in so constructing the mounting bracket that it can be applied at any point upon the windshield and that the bearing portions thereof will hold angular adjustments to which the spotlight may be turned.

A still further object lies in providing a handle by which the light casing is shifted, which handle is located conveniently for the operator of the motor vehicle and can be grasped and manipulated without extending the hand beyond the side of the machine as is now necessary where spotlights are mounted upon the side support bars of the windshield.

With these and other objects in view which will be apparent from the drawings, specification and claims, this invention includes certain novel features of construction and combinations of parts which will now be set forth.

In the drawings:—

Figure 1:
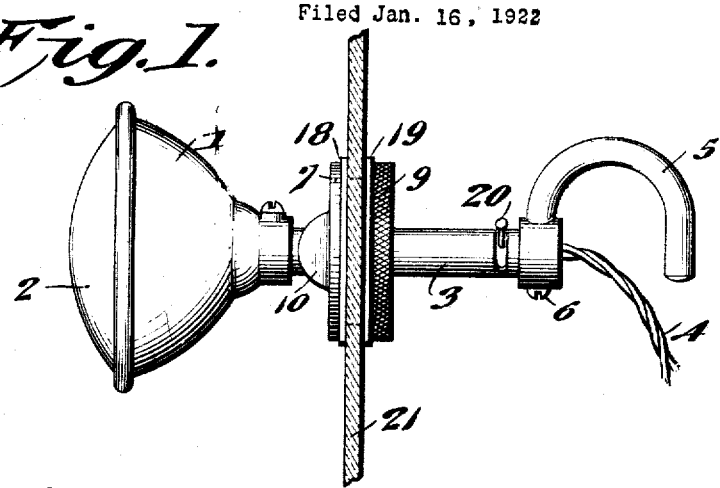
Figure 1 is a view in side elevation of a spotlight structure made in accordance with my invention, and showing the manner in which the mounting is accomplished upon the windshield glass.
Figure 2:
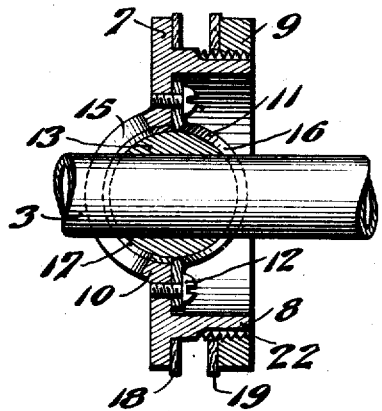
Figure 2 is a vertical sectional view through the mounting bracket and bearing.
Figure 3:
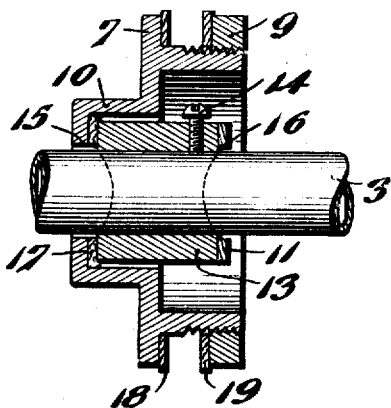
Figure 3 is a sectional view similar to Fig. 2 taken at right angles thereto.

The light casing 1 is made of the usual form to take an electric lamp bulb, and has the usual lens or glass 2. A stem 3 extends rearwardly from the light casing 1, and the usual wire 4 is connected with the electric lamp bulb and is extended to any suitable source of electric current. A handle 5 is mounted on the outer end of the stem 3 and is held in place by a screw 6.

The mounting bracket comprises a mounting ring, which is provided on its inner face with a concentric flange 8. This flange 8 is externally threaded, and a retaining ring 9 is internally threaded to be turned thereonto. The mounting ring 7 has bearing portion 10 formed on the outer side thereof and centrally disposed, and a mating bearing member 11 is provided to be held in place within the flange 8 by the screws 12. A bearing member 13 is provided with a central opening to receive the stem 3, and a set screw 14 is provided to hold this bearing member on the stem with the ends thereof extending as trunnions or pintles to be embraced by the bearing portions 10 and 11, these bearing portions being slotted as at 15 and 16 to permit the stem 3 to be swung around the bearing center of member 13.

A friction lining 17 is provided in the bearing portion 10, and friction washers 18 and 19 are provided on the adjacent faces of the mounting ring 7, and the retaining ring 9. If desired a switch can be provided in the stem 3 for the electric lamp and this can be conveniently operated by the thumb lever 20, as shown in Fig. 1.

In mounting my improved spotlight for use, an opening is provided through the windshield glass, as indicated at 21, of sufficient size to loosely receive the threaded flange 8. This flange is inserted with the light casing 1 on the outer side of the windshield glass and the retaining ring 9 is then screwed upon the flange, the friction washers 18 and 19 being against the outer and inner sides of the glass 21. This ring 9 is tightened sufficiently to bring the friction washers snugly against the glass without clamping the mounting ring 7 rigidly in place, and adjustment can be held by driving a pin or key into the slot 22 formed transversely across the thread of the flange 8. In this way the mounting ring is free to be turned by manipulation of the stem 3 through handle 5, and adjustment will be held through engagement of the friction washers with the glass. The friction lining 17 within the bearing portion 10 will retain the bearing member in set position, and by tightening and loosening the screws 12 the friction can be varied at this point. With the double bearing, it is possible to adjust the light casing to direct the rays from the lamp bulb at any desired angle.

Figure 4:
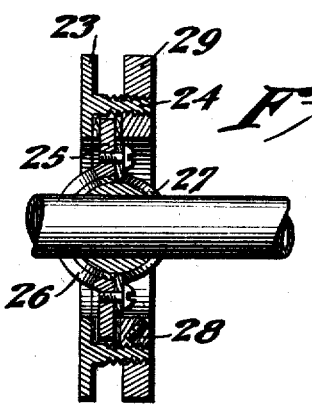
Figure 4 is a view similar to Fig. 2 showing a slightly modified form of bearing mounting.

With the disclosure in Fig. 4, the mounting ring 23 has a flange 24 on its inner side and this flange is threaded internally and externally. A bearing ring 25 has a bearing 26 thereon corresponding to the bearing 10, and a mating bearing portion 27 is provided. A retaining ring is adjusted to be screwed into the internal threads of the flange 24 to hold the bearing ring 25 in place, friction washers being provided on both sides of this bearing ring, and a clamp ring 29 is internally threaded to be screwed onto the outer threads of the flange. In applying this modified form of bracket, the flange 24 is fitted through the opening in the windshield glass and the clamp ring 29 is tightened against the inner side of the glass to hold the mounting ring 23 rigidly secured in place thereon. The bearing ring 25 turns within the mounting ring 23, and the operation of the spotlight is substantially the same as above described.

While, in the foregoing, I have described specific embodiments, and have mentioned only certain possible modifications, it will be appreciated that in practice I do not limit myself to such specific details as herein set forth, but may resort to any practical modifications falling within the scope of the invention as defined in the appended claims.

I claim:

1. In combination with a windshield glass having an opening therethrough, a dirigible bearing mounted within the opening comprising a bearing member with means to movably mount the bearing member in the opening in the glass and a second bearing movably mounted in the first bearing member, and a spotlight carried by the second bearing member.

2. A spotlight to be mounted through an opening in a windshield glass comprising a dirigible bearing to be mounted within the opening including a bearing member with means to movably mount the bearing member in the opening in the glass and a second bearing member movably mounted in the first bearing member, a stem extending through the second bearing member to have its ends on the inner and outer sides of the windshield glass, and a light casing carried by the outer end of the stem.

3. In combination with a vehicle windshield having an opening therethrough, a bearing member mounted within the opening to turn upon the glass, and a spotlight movably supported by the bearing member shiftable on an axis at an angle to the turning center of the bearing member.

4. In combination with a vehicle windshield having an opening therethrough, a bearing member mounted in the opening to turn upon the glass, a bearing structure carried by the bearing member, and a spotlight carried by the bearing structure having a lamp casing on one side of the windshield and a handle on the other side.

5. In combination with a vehicle windshield having an opening therethrough, a bearing member mounted within the opening to turn upon the glass, cushioning means between the bearing member and the glass, and a spotlight movably supported by the bearing member.

6. In combination with a vehicle windshield having an opening therethrough, a bearing member mounted in the opening to turn upon the glass, a bearing structure carried by the bearing member, a spotlight carried by the bearing structure having a lamp casing on one side of the windshield and a handle on the other side, and cushioning means between the bearing member and the glass.

7. In combination with a vehicle windshield having an opening therethrough, a bearing member mounted in the opening to turn upon the glass, a bearing structure carried by the bearing member, a spotlight carried by the bearing structure having a lamp casing projecting its rays on one side of the windshield and having shifting means on the other side, friction means between the bearing member and the windshield glass, and means to vary the frictional engagement.

8. In combination with a windshield glass having an opening therethrough, a bearing member mounted within the opening and movable with respect to the glass, a second bearing member carried by the first bearing member and movable with respect thereto substantially in the plane of the glass, and a spotlight carried by the second bearing member presenting a light casing on one side of the windshield and operating means on the other side.

9. In combination with a vehicle windshield having an opening through the glass thereof, a dirigible bearing in the opening by which a spotlight is mounted for universal movement, the dirigible bearing mounting comprising two members one independently rotatable and the two mounted to rotate in unison within the opening on an axis perpendicular to the axis of the independently rotatable member, the spotlight being directly connected with the last named member and having a light emitting portion on one side of the glass and operating means on the other side.

10. A spotlight to be mounted through an opening in a windshield glass of an automobile comprising a mounting bracket revolubly mounted in the opening of the windshield, a retaining ring by which the bracket is held in place, a transversely disposed bearing carried by the mounting bracket, a stem, a bearing member carried by said stem fitted within the bearing of the bracket, and a light casing carried at one end of said stem.

11. A spotlight to be mounted through an opening of the windshield glass of an automobile comprising a mounting bracket revolubly mounted in the opening of the windshield, a retaining ring by which the bracket is held in place, friction washers between the glass and the mounting bracket and ring, a transversely disposed bearing carried by the mounting bracket, a light casing, a stem by which the light casing is carried which stem extends through the bearing of the mounting bracket, a bearing member mounted on the stem to work within the bearing of the mouning bracket, and a handle on the inner end of the stem by which the stem is moved to change the position of the light casing.

12. A spotlight to be mounted through an opening of the windshield glass of an automobile comprising a mounting bracket revolubly mounted in the opening of the windshield, a retaining ring by which the bracket is held in place, friction washers between the glass and the mounting bracket and ring, a transversely disposed bearing carried by the mounting bracket, a light casing, a stem by which the light casing is carried which stem extends through the bearing of the mounting bracket, a bearing member mounted on the stem to work within the bearing of the mounting bracket, a handle on the inner end of the stem by which the stem is moved to change the position of the light casing, the retaining ring being adjustable to vary the frictional engagement with the windshield glass to hold adjustments of the mounting bracket, and friction means engaging with the bearing carried by the stem to hold adjustments of the stem.

In testimony whereof I hereunto affix my signature.

HERBERT E. VANDERVEER.